Figure 1:
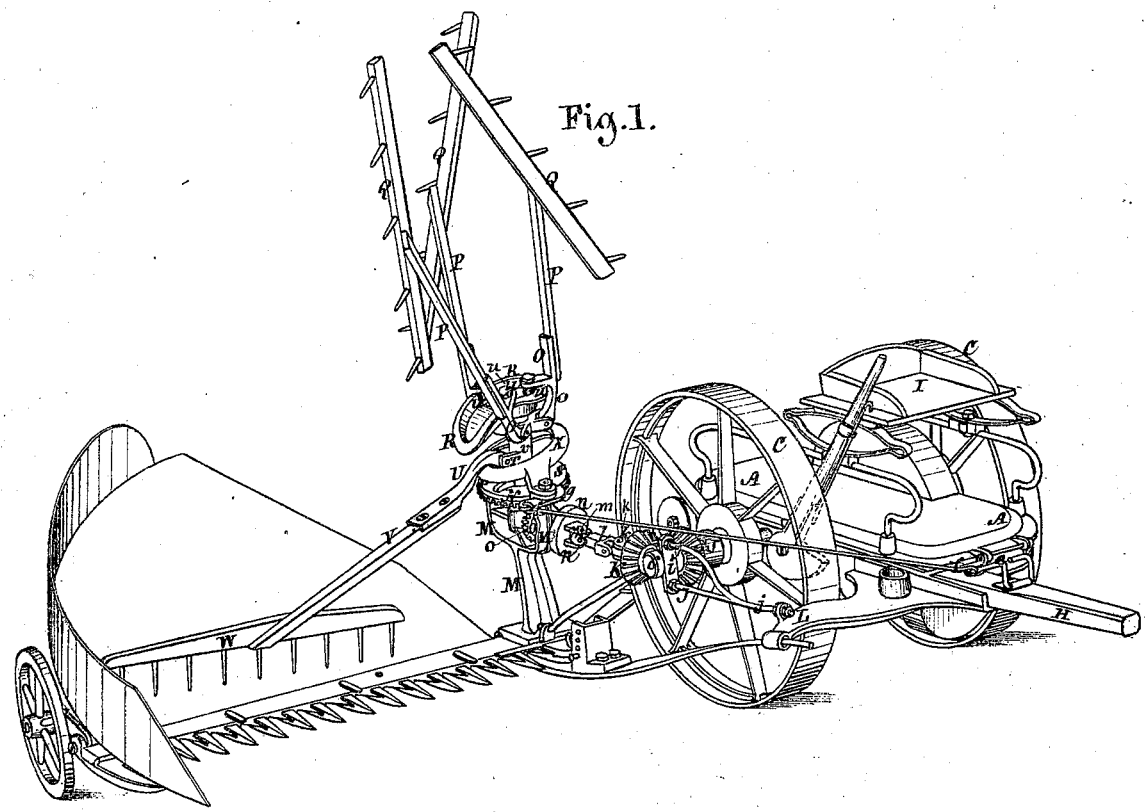

(74.)   2 Sheets--Sheet 1.

JOHN L. ROHRER & CHARLES E. ROPER.

Improvement in Harvesters.

No. 122,062.   Patented Dec. 19, 1871.

Witnesses.   Inventors.
W. S. Henderson   John L. Rohrer and Chas. E. Roper.
Edmund Masson   By attorney A. B. Stoughton.

(74.)
2 Sheets--Sheet 2.
JOHN L. ROHRER & CHARLES E. ROPER.
Improvement in Harvesters.
No. 122,062.      Patented Dec. 19, 1871.
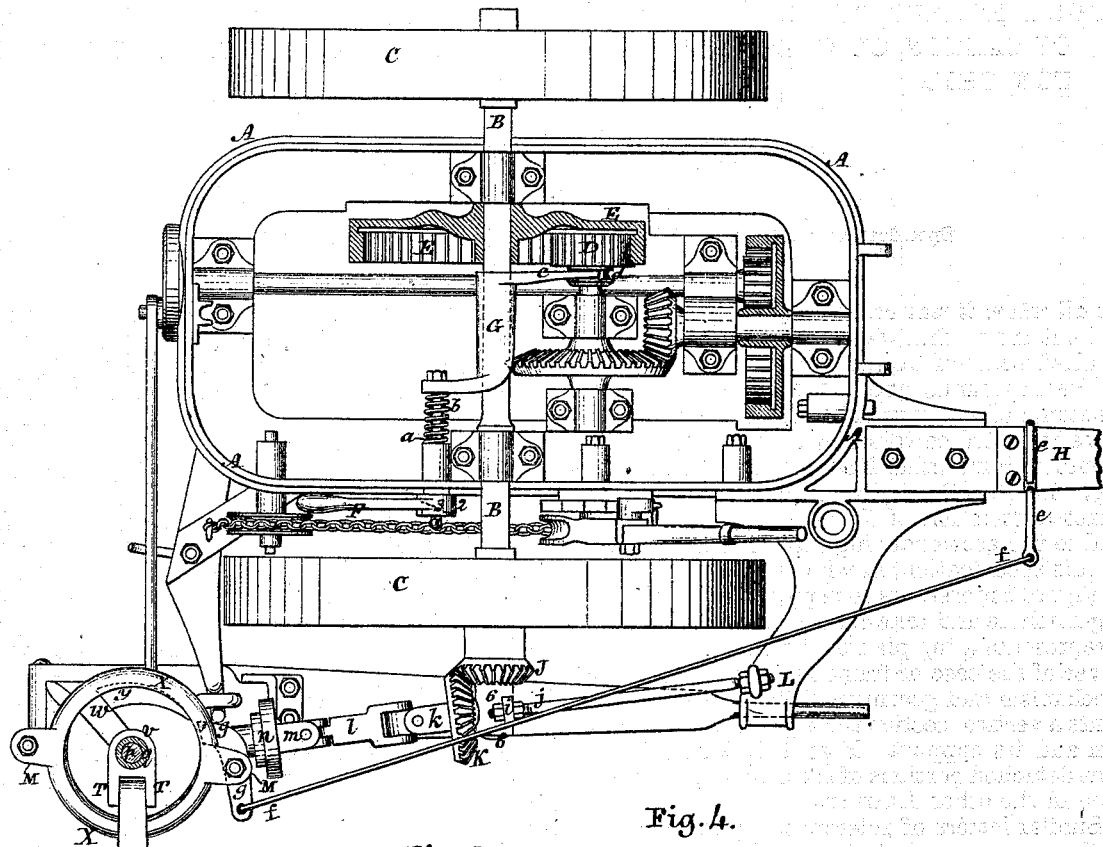
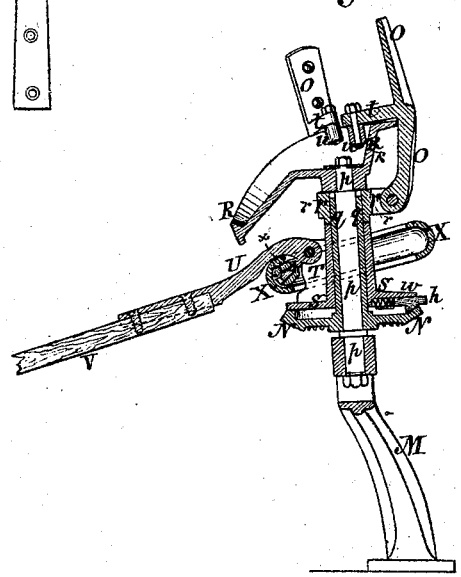
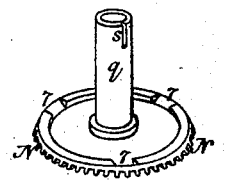
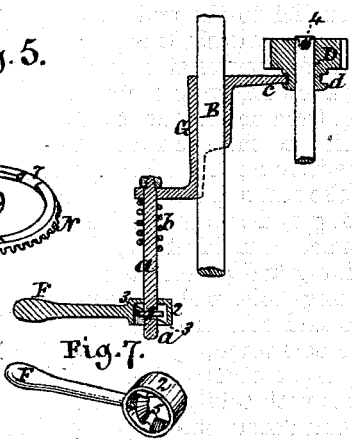
Witnesses.
W. S. Henderson
Edmund Massen
Inventors.
John L. Rohrer and Chas. E. Roper.
By attorney A. B. Stoughton.
AM. PHOTO-LITHOGRAPHIC CO. N.Y. (OSBORNE'S PROCESS.)

//122,062//

UNITED STATES PATENT OFFICE.

JOHN L. ROHRER, OF UPPER LEACOCK, PENNSYLVANIA, AND CHARLES E. ROPER, OF CANTON, OHIO; SAID ROPER ASSIGNOR TO E. BALL & COMPANY, OF CANTON, OHIO.

IMPROVEMENT IN HARVESTERS.

Specification forming part of Letters Patent No. 122,062, dated December 19, 1871.

*To all whom it may concern:*

Be it known that we, JOHN L. ROHRER, of Upper Leacock, in the county of Lancaster and State of Pennsylvania, and CHARLES E. ROPER, of Canton, in the county of Stark and State of Ohio, have invented certain new and useful Improvements in Harvesting-Machines and Rakes therefor; and that the following is a full, clear, and exact description of the same, reference being had to the accompanying drawing making a part of this specification, in which—

Figure 1 represents in perspective the harvesting-machine and rake connected therewith. Fig. 2 represents a top plan of the machine, with the cover of the case or frame removed to show the mechanism and gearing within it. Fig. 3 represents a vertical section through the rake mechanism and its support. Figs. 4, 5, 6, and 7 represent detached portions of the machine not clearly seen in the other drawing.

Similar letters of reference, where they occur in the several separate figures, denote like parts of the machine in the drawing.

Our invention relates, first, to a clutch shifting and holding mechanism, which, by a "fore and aft" movement of an exterior lever, causes the shipper on the interior of the case or frame to move parallel to the main axle, as also to the shaft carrying the shifting pinion or gear. Our invention further relates to the mechanism for forming a journal-support for the bevel-gear that is driven from one of the main drivers, and carries motion to the rake mechanism to drive it. Our invention further relates to the combination of the rake and reel driving, connecting, and disconnecting, and cam-way guiding and controlling mechanism. Our invention further relates to a cam-guiding and protected plane for protecting the locking-bolt, and directing the lever that operates said bolt in one of its directions away from the bolt when, by any accident or inadvertence, it might otherwise be in position to come in contact with said projecting spring-bolt.

To enable others skilled in the art to make and use our invention, we will proceed to describe the same with reference to the drawing and the letters of reference thereon.

The main frame A of the machine is composed of a rectangular, or nearly so, shaped cast-iron box or case, which contains the gears for driving the cutters. This frame, case, or box, is supported on the main axle B, which passes through it; and the axle is supported in or by the main driving-wheels C C. The pinion D in the interior of the case is the moving one, that is clutched and unclutched to and from its shaft, to drive or cease to drive the cutting apparatus, as may be required. This pinion, when driven, is in mesh with the main cogged wheel E on the main axle B; and it is shifted by a lever, F, on the exterior of the case or main frame A as follows: The shaft $a$, upon the exterior end of which the lever F is placed and operates, has a pin through it, as seen at 1 in Fig. 6. In the hub 2 of the lever there is a cam-plane, 3, which, when in contact with said pin 1, and moved, causes the shaft $a$ to move endwise toward the exterior of the case or frame, and in moving to compress the spring $b$. This outward movement of the shaft $a$ draws with it the guide or slide G, which lies upon and partly encircles the main axle B, so as to be guided thereby, and the movement of the slide G moves the shipper-arm $c$, which arm, in turn, straddling the collar $d$ of the pinion D, moves the pinion on its shaft far enough for a groove in its face to leave a pin, 4, Fig. 6, passing through said shaft, and so unclutch the pinion D. When the lever F has been thrown up into a position that will effect this unclutching the pin 1 drops into recesses 5 in the lever-hub, which holds the lever in that position, and so holds the pinion out of clutch. When the lever F is reversed—that is, thrown downward and backward—the expansion of the spring moves the guide G and clutch-arm $c$, and these move the pinion until it receives the pin 4 in a slot or groove made for that purpose, which clutches the pinion to its shaft, and by means of said shaft motion is communicated through other gears to the cutters. On the pole H, which is rigidly attached to the main frame, there is a vibrating treadle, $e$, which is within the reach of the driver or conductor from his seat I, and which he can rock with his foot. To this treadle or foot-lever is connected one end of a rod, $f$, the other end of which is fastened to a pivoted lever, $g$, located close to the rake and reel driving mechanism. The object of this lever, and mechanism connected with it, is that the driver from his seat may, by pushing in a spring-bolt, h, Fig. 3, disconnect the rake-driving mechanism from the reel-driving mechanism, so that the rake may stop while the reel continues to work on, as will be explained. On the hub of the drive-wheel next the standing grain there is a bevel-gear, J, which meshes with and gives motion to a bevel-wheel, K, which is supported on or around the point of the main axle by brace-rods j j extending from the arm L, which is a part of, or firmly connected to, the main frame. The braces j are connected to a bar, i, and to this bar is connected a socket or sleeve, 6, which receives the point of the axle, by which it is steadied, and to this socket or sleeve there is attached a wrist or journal, on which the gear K can turn, while at the same time it is held in true mesh with its bevel-driver J. To the back of the bevel-gear K there is cast or otherwise fastened a projection, k, which constitutes, with the jointed links l m, a toggle-shaft, that connects with a clutch-box, n, which, by means of a pawl and ratchet in its interior, will hold while the machine is moving forward, and slip when it is backed; the object being to run the rake and reel when the machine is advancing only. To the back of the clutch-box n there is attached a shaft or journal, supported in the stand M and carrying a bevel-pinion, o, that works into and drives the larger bevel-gear N, and this gear drives the rake and reel, or the reel without the rake, as occasion may require, and as will be explained. On the stand or bearing-post M there is permanently affixed a spindle, p, over which is first placed the large bevel-wheel N, the long hub q of said wheel extending up to near the top of the spindle p, and upon its top portion is placed the head r, to which is pivoted the metallic holders O, that carry the reel-arms P and the reel-heads Q thereon. A feather in the turning-head r takes into a slot, s, in the hub p, and thus causes both to turn together, while they are easily separated when necessary. Upon the holders O there is an arm, t, carrying a friction-roller, u, which runs upon the cam-plane R, and thus gives to each reel-arm a rising and falling motion, in addition to their rotating motion. Over the long hub p of the bevel-wheel N there is slipped the hub or sleeve v of a disk, S, which disk sits close to the bevel-gear N, as seen in Fig. 3; and in or under a covered recess, w, on the under side of this disk S is a spring-bolt, h, above referred to, which, when held out by its spring, takes into one of the slots 7, on or in a rim on the top or back of the bevel-gear N, and holds or locks the disk to the wheel so that both will move together. But when this bolt h is forced back, then the disk S is released and remains stationary while the wheel N and its hub and the reels connected thereto continue in motion. To lugs T on the hub or boss v is hung or pivoted the metallic rake-holder U, to which the shank V of the rake W is attached, and on this holder U there is a short arm, 8, that has upon it a sphere or ball, x, that runs in a stationary tubular cam-way, X, fastened to or on the stand M. This ball and tubular cam-way, while they allow the rake to move around freely and to rise and fall in its circuit, hold it to its work and in its path. The rake acts like the reel-arms in reaching into and drawing the grain to the cutters, and it also acts to sweep the cut grain from the platform or grain table. Where the bolt h projects from the rim of the disk S there is a cam projection, y, against the outer edge of which the end or point of the lever g moves and is guided, and so that said lever cannot come against the side of the projecting-bolt, in which case one or the other would be broken. This casualty would be most likely to happen by the driver inadvertently moving the foot-lever, or by the sticking of any of the parts; with the cam-projection y it cannot happen, and yet the driver, with his foot upon the treadle, can force the point of the lever g against the end of the spring-bolt, and force it back, thus disconnecting the rake-driving mechanism from the driving-gear N, and allow the rake to remain stationary while the reels continue to run. The cutting apparatus, the platform, and their connection with the main frame, are shown in Fig. 1, and need not be described in detail. The post or stand M leans forward of its base, and outward toward the standing grain, for the purpose of balancing the platform and for bringing the rake and reel driving mechanism into good working position. The raising and lowering devices, as also the driving-gear in the box-frame, are distinctly shown in the drawing, and need no further explanation.

Having thus fully described our invention, what we claim is—

1. The combination of the lever F, shaft a, guide G, and shipper-arm c, with the sliding-pinion D, for the purpose of throwing the cutters into or out of action, and so holding them, as described and represented.

2. The combination of the braces j, bar i, and sleeve or socket 6, with the point of the axle or center motion of the main drive-wheel, for making a journal-support for the gear K, as and for the purpose described and represented.

3. The combination of the gear N and disk S with the spring-bolt, by which they are connected and disconnected at pleasure, and with their bosses or hubs q v and cam-ways R X, so that the rake may revolve with the reels, or remain stationary while the reels continue to run, substantially as described and represented.

4. The combination of the cam-protecting surface y with the spring-bolt h and lever g, so that said lever cannot reach said bolt except when it is designed to do so, and by pressure upon the foot-lever, as described and represented.

JOHN. L. ROHRER.
CHAS. E. ROPER.

Witnesses to ROHRER:
　W. B. WILEY,
　PHILIP S. BAKER.
Witnesses to ROPER:
　HENRY A. WISE,
　ALEX. BIERCE.